(12) United States Patent
Schmidt

(10) Patent No.: US 8,556,215 B1
(45) Date of Patent: Oct. 15, 2013

(54) AERODYNAMICALLY EFFICIENT SURFACES

(71) Applicant: Eric Thomas Schmidt, Wichita, KS (US)

(72) Inventor: Eric Thomas Schmidt, Wichita, KS (US)

( * ) Notice: Subject to any disclaimer, the term of this patent is extended or adjusted under 35 U.S.C. 154(b) by 0 days.

(21) Appl. No.: 13/654,629

(22) Filed: Oct. 18, 2012

Related U.S. Application Data

(60) Division of application No. 13/104,714, filed on May 10, 2011, now Pat. No. 8,315,847, which is a continuation-in-part of application No. 11/484,212, filed on Jul. 11, 2006, now abandoned.

(60) Provisional application No. 60/698,454, filed on Jul. 11, 2005.

(51) Int. Cl.
*B64C 21/10* (2006.01)

(52) U.S. Cl.
USPC .......................... 244/200; 244/200.1; 244/91

(58) Field of Classification Search
USPC .......................... 244/200, 200.1, 130; 296/91
See application file for complete search history.

(56) References Cited

U.S. PATENT DOCUMENTS

| | | |
|---|---|---|
| 2,261,558 A | 11/1941 | Orloff |
| 2,899,150 A | 8/1959 | Ellis, Jr. |
| 3,568,956 A | 3/1971 | Swanson |
| 3,578,264 A | 5/1971 | Kuethe |
| 3,934,923 A | 1/1976 | Lissaman et al. |
| 4,030,779 A | 6/1977 | Johnson |
| 4,180,290 A | 12/1979 | Drews |
| 4,284,302 A | 8/1981 | Drews |
| 4,650,138 A | 3/1987 | Grose |
| 4,736,912 A | 4/1988 | Loebert |
| 4,907,765 A | 3/1990 | Herschel et al. |
| 5,069,403 A | 12/1991 | Marentic et al. |
| 5,114,099 A | 5/1992 | Gao |
| 5,133,516 A | 7/1992 | Marentic et al. |
| 5,167,387 A | 12/1992 | Hartwich |
| 5,171,623 A | 12/1992 | Yee |
| 5,289,997 A | 3/1994 | Harris |
| 5,378,524 A | 1/1995 | Blood |
| 6,050,523 A | 4/2000 | Kraenzien |
| 6,345,791 B1 | 2/2002 | McClure |
| 6,363,972 B1 | 4/2002 | Umazume et al. |
| 6,857,604 B2 | 2/2005 | Schmidt |
| 6,908,063 B2 | 6/2005 | Bearman et al. |
| 2002/0000497 A1 | 1/2002 | Drews |
| 2004/0051004 A1 | 3/2004 | Bearman et al. |
| 2007/0018055 A1 | 1/2007 | Schmidt |

*Primary Examiner* — Philip J Bonzell

(57) ABSTRACT

A wave form tile in the form of a natural wave is provided to replace traditionally smooth surfaces to aid in more efficient shedding of a fluid medium. The wave form tile is also applied to proportionally spherical fractal surfaces defined for the surface of a vehicle.

1 Claim, 16 Drawing Sheets

B-B

A-A

AERODYNAMICALLY EFFICIENT SURFACES

RELATED APPLICATIONS

This application is a divisional of application Ser. No. 13/104,714 filed on May 10, 2011, which is incorporated herein by reference. Application Ser. No. 13/104,714 a continuation-in-part of application Ser. No. 11/484,212 filed on Jul. 11, 2006. Application Ser. No. 11/484,212 claimed the benefit of Provisional Application No. 60/698,454 filed on Jul. 11, 2005.

FIELD OF THE INVENTION

The present invention relates generally to the field of fluid dynamic drag reduction. More specifically, the present invention pertains to techniques or devices for regulating the flow of air or water passing over a surface to reduce drag.

BACKGROUND OF THE INVENTION

The harnessing of engines to power vehicles at high speeds has created a need to cover powered vehicles with aerodynamically efficient surfaces that reduce drag. Reducing the drag resulting from the motion of an object through a fluid is one way to increase the efficiency of powered vehicles. Examples of previous attempts to reduce the drag of vehicle surfaces are taught in U.S. Pat. No. 5,114,099 by and U.S. Pat. No. 2,800,291 by Stephens et al. Although numerous attempts have been made to reduce the aerodynamic drag of surfaces, the applicant proposes that there are still significant opportunities for improvement in this field.

SUMMARY

Improved surfaces for reducing aerodynamic drag are configured to exploit the natural properties of a fluid as it moves over surfaces. By presenting the fluid with paths of least resistance it is possible to configure a surface that can move through a fluid with less resistance. In a first embodiment, an aerodynamic surface is covered with tiles waveform surfaces. In an example of the first embodiment, the tiles are generally rectangular or diamond shaped and are oriented such that each leading corner of each tile is oriented into the oncoming fluid stream, a trailing corner is oriented downstream and opposite side corners are arranged such that a line extending between them is generally normal to the direction of the fluid stream. In most examples, the fluid will be air and the surface will be covering a vehicle (such as an aircraft or land vehicle). The surfaces of the tiles are generally shaped as if a cresting wave had been mapped to the surface of the segment. The surfaces are shaped such that when a cross section is taken through each tile using a cross section plane that is generally normal to the overall surface and parallel to the general direction of the fluid flow (i.e. parallel to a line passing through the upstream and downstream corners of the segment), the cross section of each segment will have the form of an overturning or cresting wave. This will generally be the case regardless of where this cross section is taken. Accordingly, this general shape is constant if the cross section is taken near a side corner or if the cross section is taken at a center line between the side corners. This overturning wave form contour mimics the general shape assumed by fluid surfaces under high wind conditions and is believed to be a surface that presents paths of least resistance to the fluid flowing over that surface. This general form is mapped onto tiles that can then be arranged on a vehicle surface to define a vehicle surface which the applicant proposes will generate less drag than a traditional smooth vehicle surface.

In a second embodiment, the volume bounded by a vehicle is considered as a volume that can be filled with progressively smaller spheres. Thus, for example, with an automobile, a first sphere of the largest possible diameter is fit into the largest open space within the volume defined by the outside surfaces of the automobile. Next, smaller spheres are selected having diameters at a predetermined fraction of the diameter of the first sphere, for example 0.8 the diameter of the first sphere. These next smaller spheres are then fit into the remaining unoccupied spaces of the inside volume of the automobile. This process is continued until spheres are selected having diameters that are greater than a predetermined fraction of the diameter of the first sphere, for example 1/10th of the diameter of the first sphere and these smallest spheres are fit into the remaining spaces. After the volume has been filled with spheres as described above, a surface is defined by draping an imaginary flexible membrane over the spheres near the surface of the vehicle volume. This can be done with solid modeling software as would be well known by those skilled in the art. Still further, wave form surfaces may be mapped onto the spherical contour segments that are present on the outside surface of the vehicle as formed by the process described above. In this second embodiment, an vehicle surface is defined that presents less resistance to fluid flowing over the vehicle surface.

BRIEF DESCRIPTION OF THE DRAWINGS

FIG. 5A is a plan view of one wave form tile of an aerodynamic surface.

DETAILED DESCRIPTION

Figure 1:
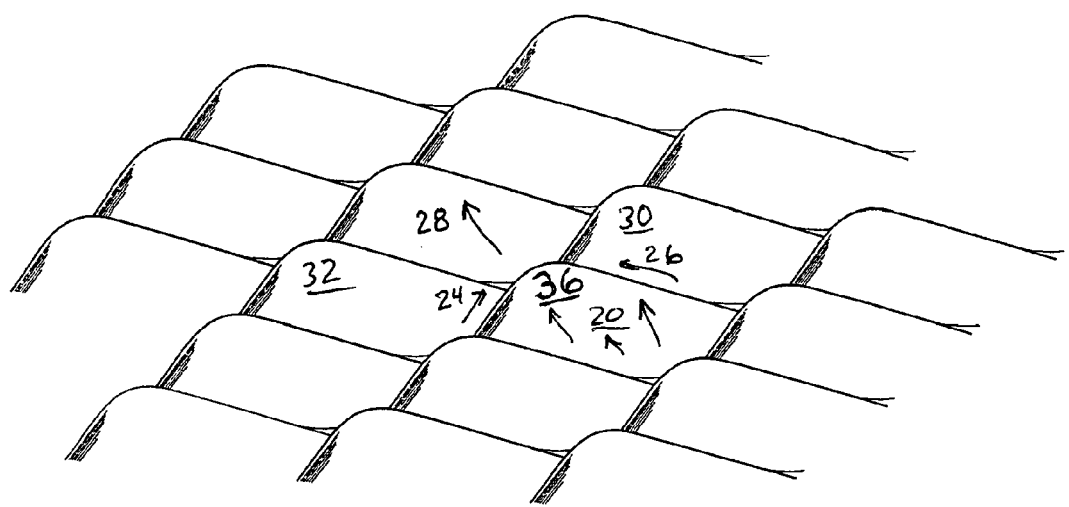
FIG. 1 is a perspective view of a plurality of tiles shown from the perspective of approaching fluid.
Figure 2:
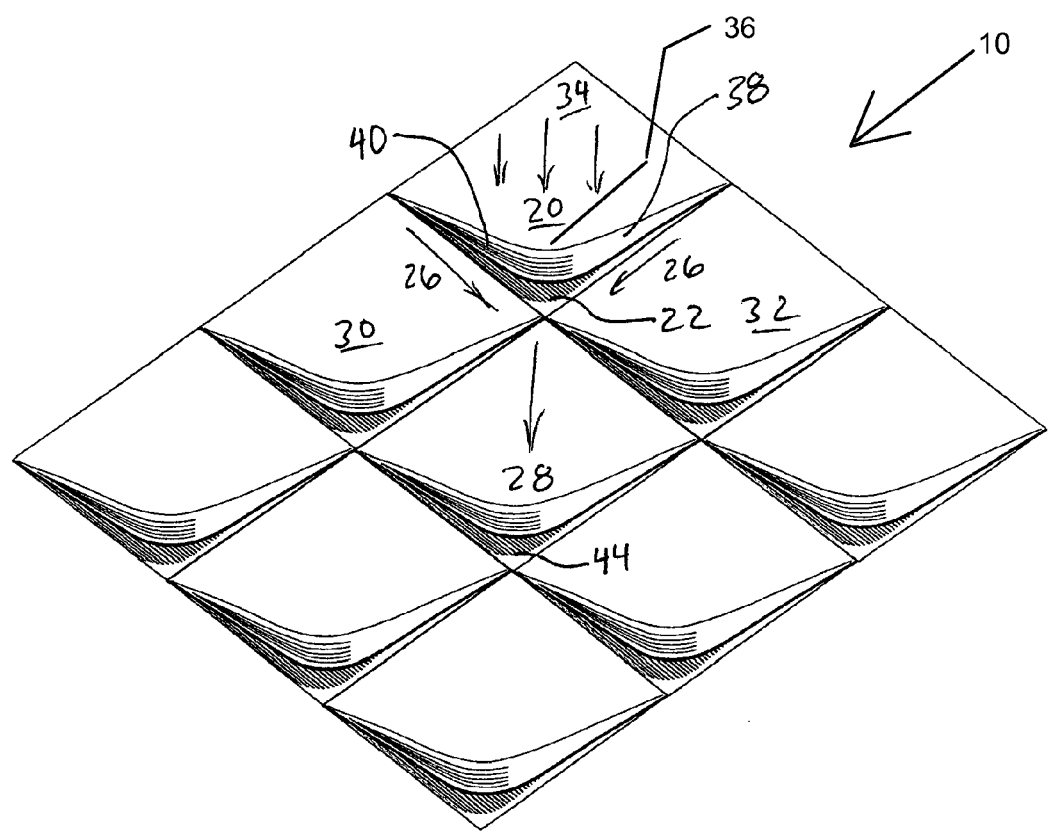
FIG. 2 is a perspective view showing a tile with four wave forms, like those shown in FIG. 1 from a reverse angle perspective view.
Figure 3:
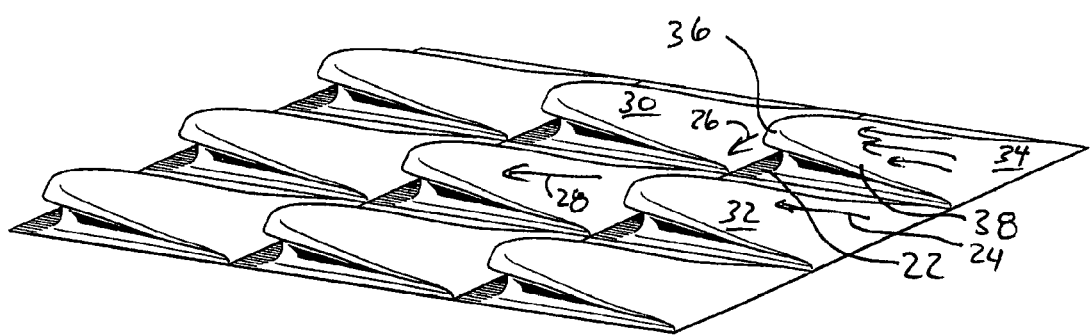
FIG. 3 is a perspective view of the tiles of FIGS. 1 and 2 shown from one side.

An improved aerodynamic surface 10 is shown in FIG. 1. As can be seen in FIG. 1, surface 10 includes a plurality of wave form tiles that includes wave form tiles 30, 32 and 34. As can be seen in FIG. 2, each wave form tile has a surface that is topographically shaped in the form of an overturning wave. Wave form 20 shown in FIG. 2 may be selected for closer consideration. As can be best seen by referring to FIGS. 5A-5D, wave form tile 20 is shown to include a forward corner 34 and a rear corner 22.

Figure 5B:
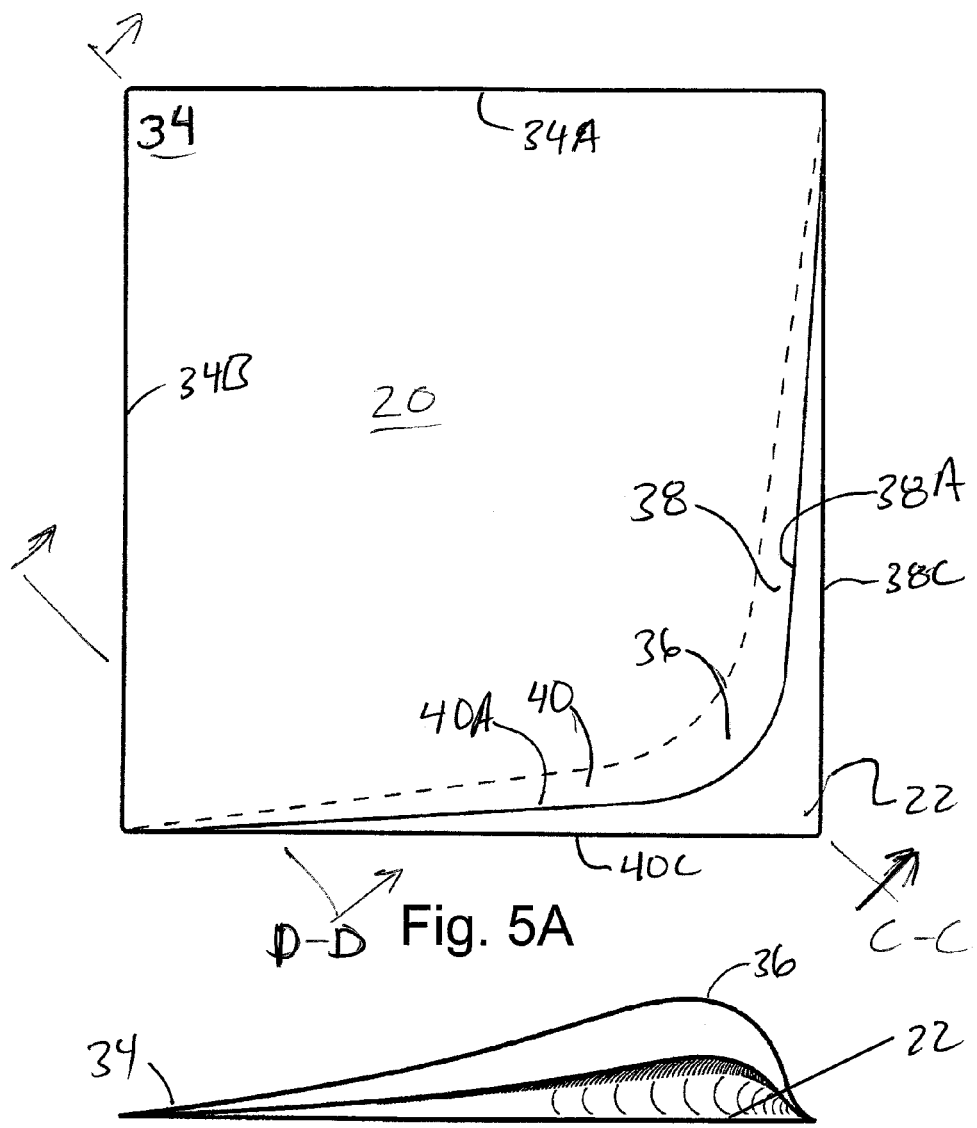
FIG. 5B is a side view of the wave form tile of FIG. 5A.
Figure 5C:
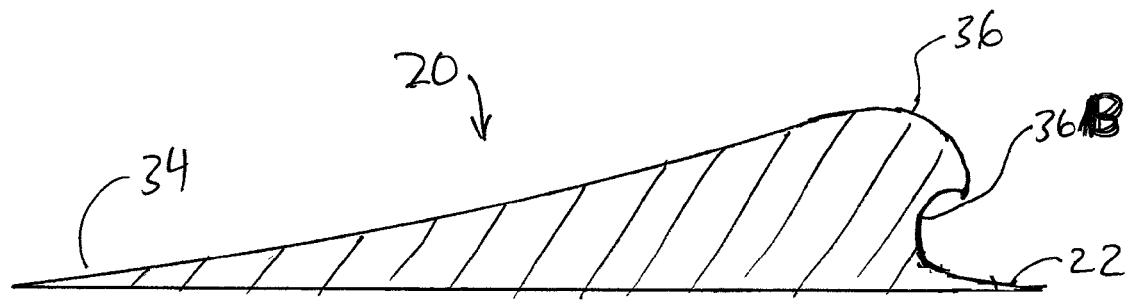
FIG. 5C is a cross section view of the wave form tile of FIG. 5A taken from plane C-C of FIG. 5A.
Figure 5D:
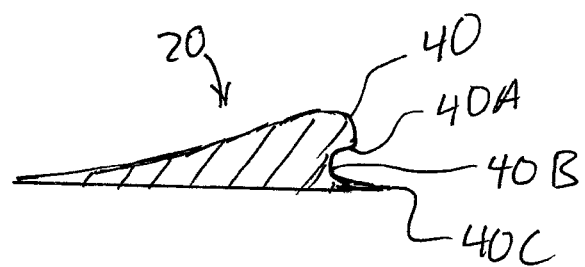
FIG. 5D is a cross section view of the wave form tile of FIG. 5A taken from plane D-D of FIG. 5A
Figure 6:
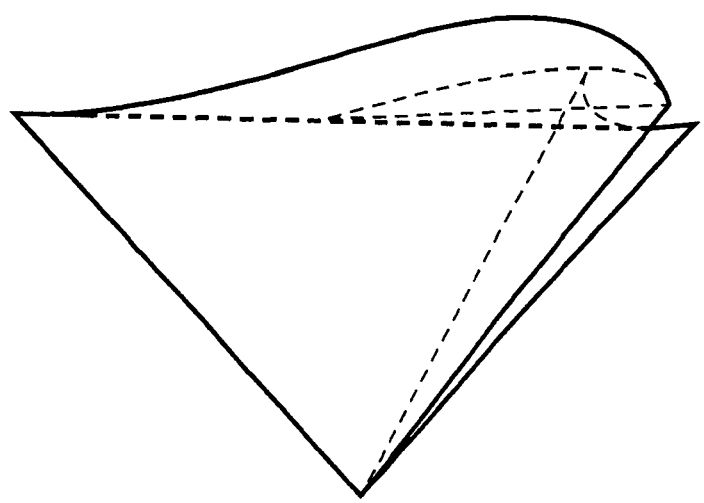
FIG. 6 shows an elevation drawing of a wave form tile that could be applied to a square corner such as the corner of a rectangular trailer.
Figure 7:
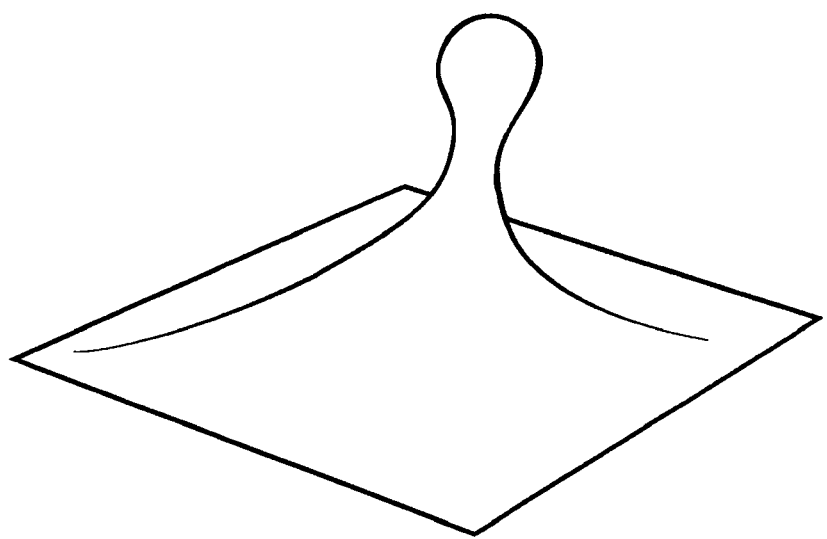
FIG. 7 shows a wave form tile the shape of a drip.
Figure 8:
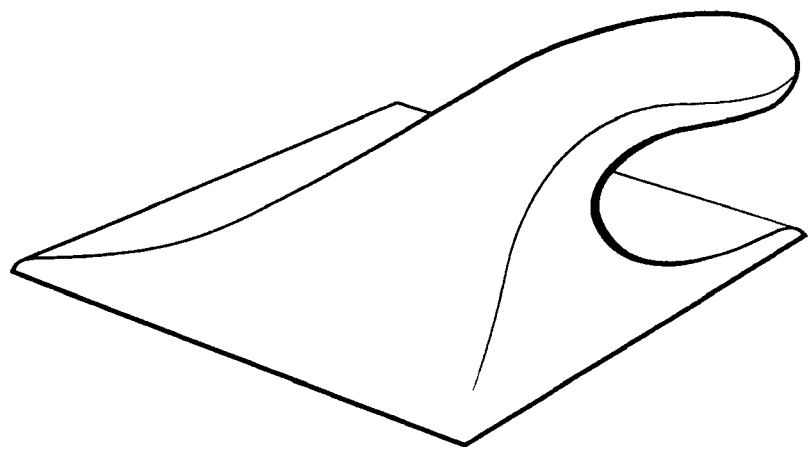
FIG. 8 shows a wave form tile the shape of a drip deformed at a generally right angle.
Figure 9:
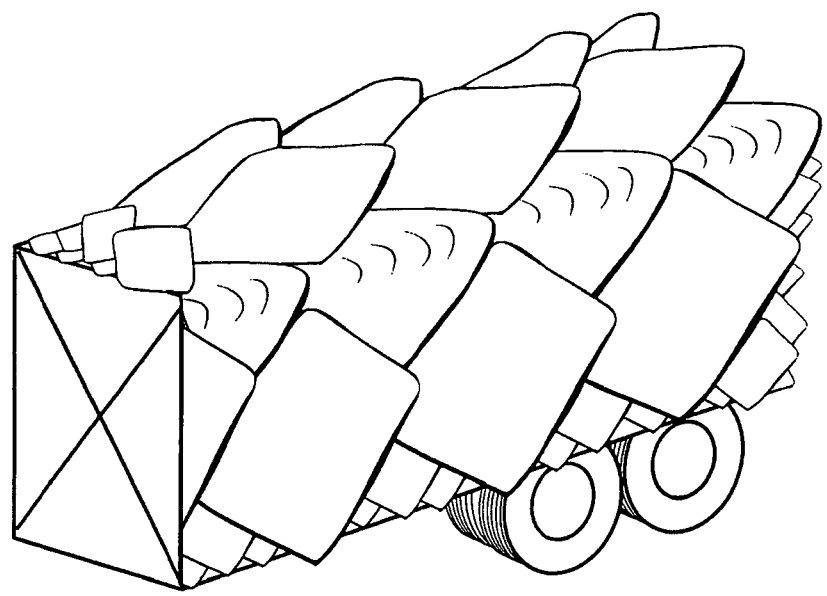
FIG. 9 shows a semi-trailer covered in wave form tiles.
Figure 10:
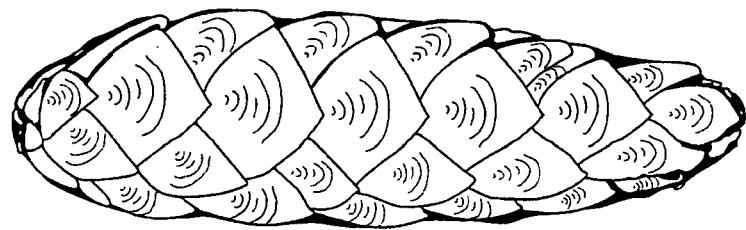
FIG. 10 shows a first possible pattern of wave form tiles as applied to a fuselage shape.

As can be best seen by referring to FIGS. 2, 3 and 5A-5D, the contour of the surface of wave form tile 20 includes two crest edges 38 and 40 that run down the trailing edges of tile 20 and meet at a curved crest portion 36. FIGS. 5C and 5D, which give cross sections taken from planes C-C and D-D indicate in FIG. 5A, provide a way to visualize the general shape of tile 20 and the shapes of trailing edge portions 38 and 40 and crest portion 36 of tile 20. As can be seen in FIGS. 5C and 5D, the wave form defines a curved crest surface 40 which terminates in a crest edge 40A. A symmetrically identical geometry is present for a curved crest surface 38 and a crest edge 38A on the other side of plane C-C shown in FIG. 5A. Recessed under crest edge 40A is an undercutting portion 40B which finally terminates in a lower edge 40C. As can be seen in FIGS. 5A, 5B and 5C, these opposite trailing edge portions blend smoothly to define trailing crest portion 36 which is shown in profile in FIG. 5B and in cross section in FIG. 5C.

The airflow across wave form tile 20 and by extension across a pattern of such wave form tiles as shown in FIG. 2 will now be considered. When wave form tiles such as wave form tile 20 are, for example, disposed in a pattern on the surface of a vehicle, air flow will first encounter wave form tile 20 (as shown in FIG. 5A) at forward corner 34A and along leading edges 34A and 34B. With reference to FIG. 2, air will be caused to flow from a forward corner 34 to a rear corner 22 across tiles, 20, 30, 28 and 32. As the air travels across the surface of tile 20, from corner 34, it will first encounter the upper surfaces of wave 20. When it encounters the upper surfaces of this wave form surface, it will be managed such that it is directed toward the general area of the forward crest 36 of the wave 20. The air is guided by crest edges 38 and 40 and converges at some point proximate to crest portion 36 and generally above point 22. Once the air has been directed in this manner so as to be concentrated proximate to crest portion 36, the air traveling from wave form tile 20 will tend to move across tile 28 such that it is concentrated more toward the center line of wave form tile 28. This produces channels of air-flow instead of the sheets of air which might occur when air is moving over a smooth surface.

If One skilled in the art were to consider wave form tile 20 in a generally upright orientation, one could visualize water running down wave form tile 20. As a sheet of water runs down from forward edges 34A and 34B (shown in FIG. 5A) it adheres to drip edges 38 and 40 and then converges at point 36, to become a unified stream. The unified stream of water leaving wave form tile 20 would then encounter wave form tile 28 near its midpoint. While remaining concentrated in a converged stream, the water would pass over wave 28 and flow from wave 28 in a similar fashion as it did wave form tile 20 leaving areas such as 22 untouched by water. Air and water are fluids, and at a conceptual level, will react in similar ways.

Figure 11:
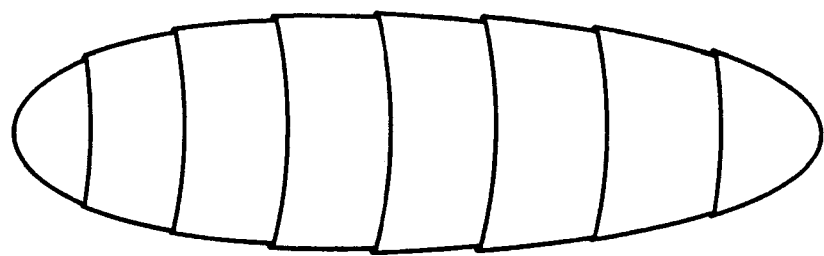
FIG. 11 shows a second possible pattern of wave form tiles as applied to a fuselage shape.
Figure 12:
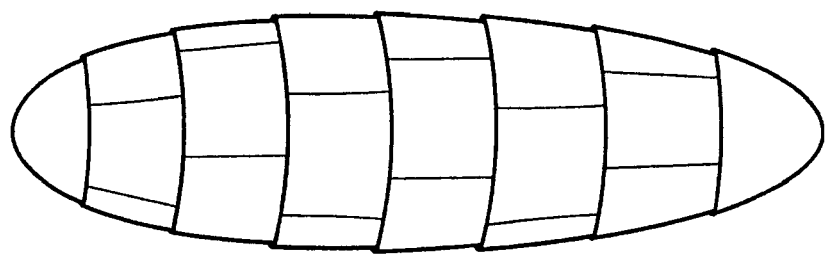
FIG. 12 shows a third possible pattern of wave form tiles as applied to a fuselage shape.
Figure 13:
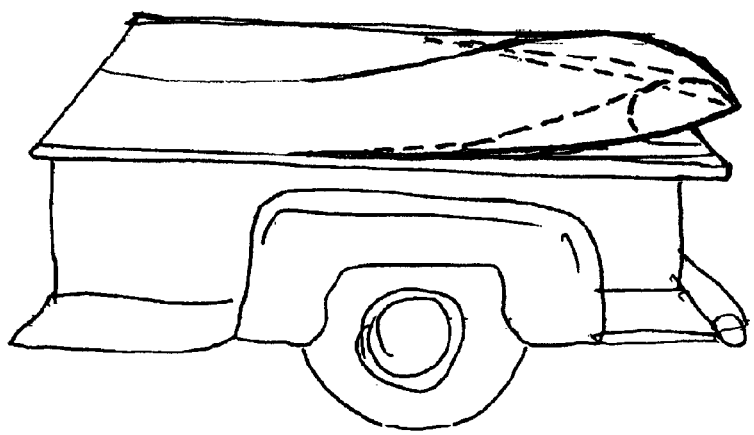
FIG. 13 shows a wave form tile on a pick-up truck bed.
Figure 14B:
FIG. 14B shows a cross section of the wave form tile pattern on a circular wheel shape of FIG. 14 taken from the arc shaped view indicated by B-B in FIG. 14.
Figure 14:
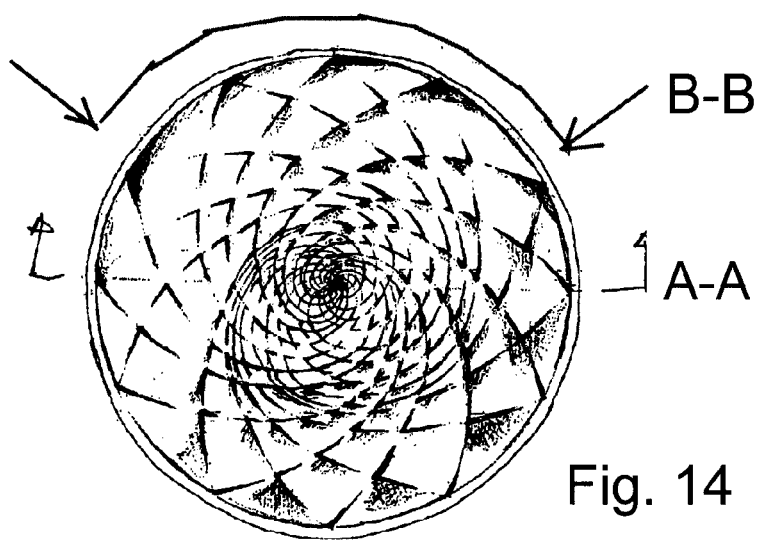
FIG. 14 shows the wave form tile pattern on a circular wheel shape.
Figure 14A:
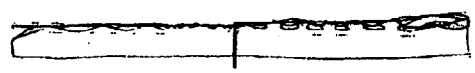
FIG. 14A shows a cross section of the wave form tile pattern on a circular wheel shape of FIG. 14 taken from plane A-A indicated in FIG. 14.

Relative motion of the entire device through the air (e.g., on the outside surfaces of a vehicle or airplane) will cause pressures in and around area 22 to be relatively higher than the areas of high wind exposure due to shielding or protection from the faster moving air. This elevation, or pooling, of pressurized air shields the surfaces of the tile from being directly contacted by the air traveling across the tile when the vehicle is in motion. Instead of engaging the tile surfaces, the lower pressure traversing air is repelled by the pressurized air. This air-to-air contact creates less drag than what would be air to vehicle surface contact with a conventionally smooth design. Therefore, drag is decreased and the vehicle travels with more aerodynamic efficiency. Of the numerous embodiments, the tile described in the present invention could easily be inverted and rotated 180 degrees, with area 22 in FIG. 2 becoming the highest point of lowest pressure, and with 36 in FIG. 2 becoming a recessed high pressure zone. High pressure pockets may also be built into a surface by constructing wave forms perpendicular to the flow of encountered fluid, like that of a shelf cloud on the front of a storm, preferably with an alternate undulation as FIGS. 1, 2 and 5A. The perpendicular wave form can be simplified to a continuous ring, of repeating wave forms as illustrated in FIG. 11, also including the recessed tubular wave form.

Figure 4:
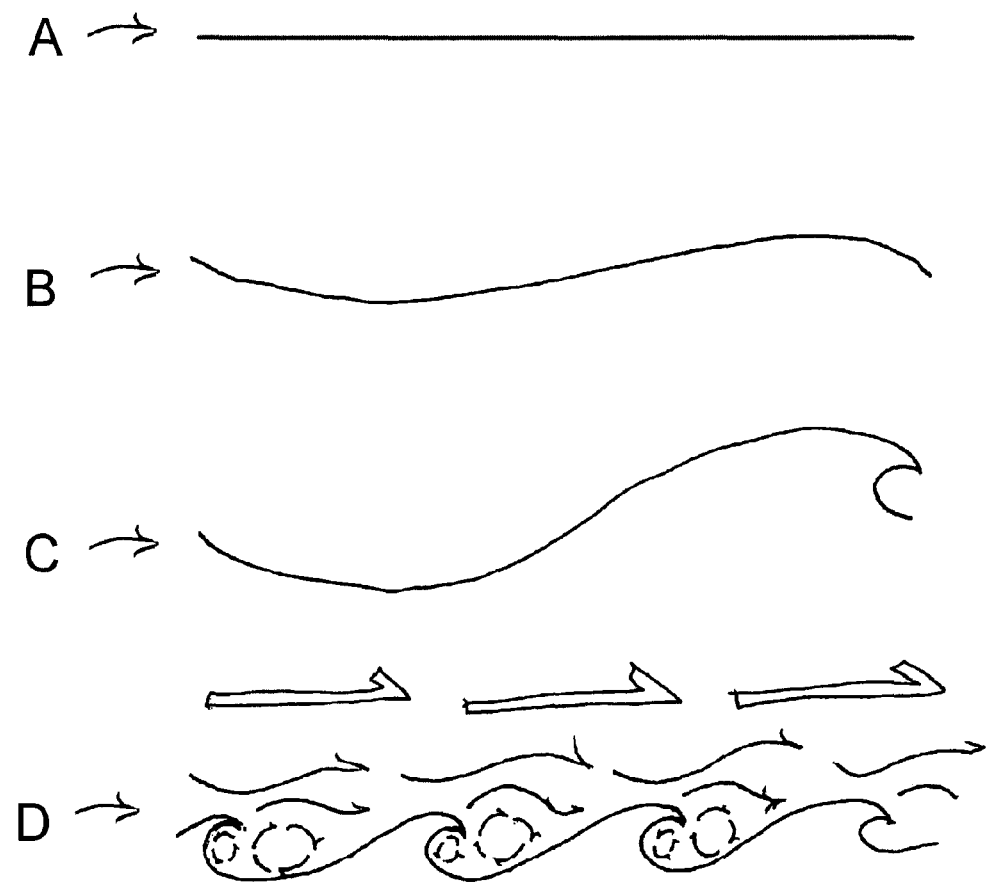
FIG. 4 is a side view showing how waves progressively form on the surface of a fluid as wind speed increases from condition A through condition D.

As relative wind speed increases, so do the surface waves of the fluid. As can seen in FIG. 4, as the wind speed increases from a calm condition as shown in condition A to a high wind condition as shown in condition D, surface waves become increasingly pronounced. In condition D, wave crests are being pulled leeward to the point the tip breaks off and becomes water spray. This may also be viewed as a physical molecular representation of the process of a liquid becoming gas on a boiling surface. The point at which the wave begins to break, a cavity, is formed, producing a high-pressure area/zone or cell. The tubular wave shaped cavity reacts with adjacent air to create alternating zones of high pressure which act to reduce the overall drag occurring the surface of the water.

Accordingly, by mimicking shapes in this naturally occur when fluids react with eroded surfaces or even when living organisms adapt to optimize the flow of fluid over surfaces, we are able to achieve a natural; cooperative interface between solids and fluids, by shaping the solid to resemble that of a fluid.

Figure 15:
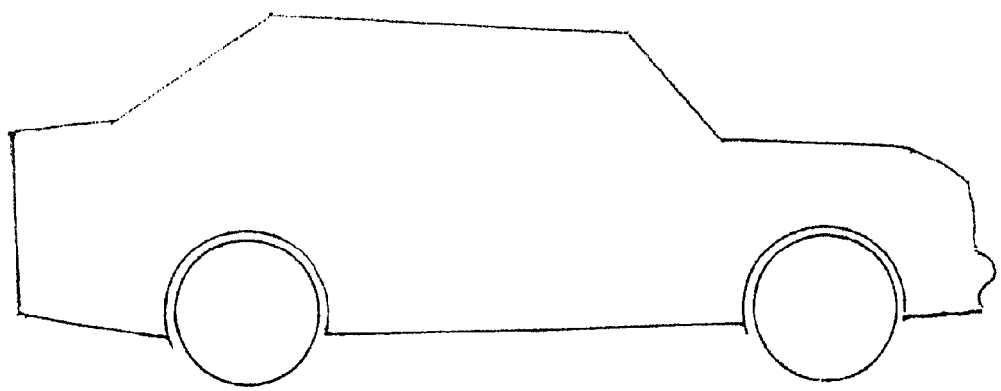
FIG. 15 is a side profile view of an automobile.
Figure 16:
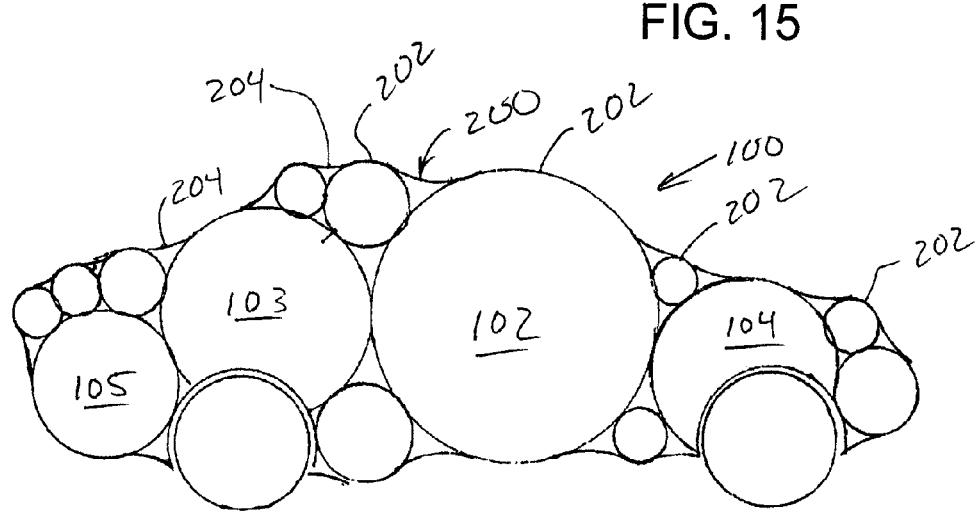
FIG. 16 is a side profile view of an automobile with its internal volume defined by progressively proportioned spheres.

FIGS. 15-18 illustrate a process for patterning the surface of a vehicle which may be termed a spherical design proportioning system. FIG. 15 shows a side profile of a typical automobile. The object here is to reshape the surface of this automobile into a surface that cooperates with airflow around the vehicle. As shown in FIG. 16, an automobile has outer surface which enclose an automobile volume 100. A first sphere 102 is placed in the largest open space available in volume 100. Thus, first Sphere 102 is preferably the largest sphere that can be placed within volume 100. A second sphere 103 is placed in the next largest unoccupied space in volume 100. As can be seen in FIG. 16, second sphere 103 is smaller than first sphere 103. The process continues with a third sphere 104 and a fourth sphere 105 and numerous smaller spheres. The spheres used preferably progressively decrease in diameter. Moreover, it is preferable that each decrease in diameter be governed by a constant ratio. So for example, second sphere 103 may have a diameter of 80% of the diameter of sphere 102. Third sphere 104 may have a diameter of 80% of the diameter of second sphere 103 and so on. This progression of decreasing diameters is preferably terminated at a predetermined minimum diameter of, for example, 1/10th the diameter of first sphere 102.

Next, as can be seen in FIG. 16, a flexible membrane 200 is draped over the spheres to define a new, spherically proportioned surface. This surface includes a multitude of spherical hills 202 or bumps that are separated from each other by smooth transitioning valleys 204. Thus between the troughs of adjacent valleys are defined spherical zones which are arranged over the surface of vehicle 100. Those skilled in the art will appreciate that this modeling exercise may be conducted using computer aided design systems. This process conceptually relates to the use of fractal geometry to define naturally appearing structures such as mountain ranges and the like. In essence, a spherically proportioned surface is a fractal surface defined by progressively smaller spheres with a lower bound defined for the smallest spheres used to define the surface.

Figure 17:
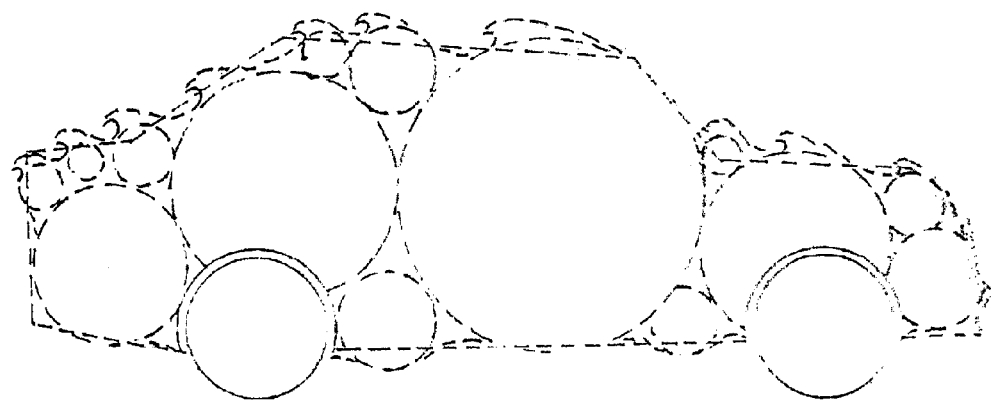
FIG. 17 is a side profile view of an automobile with its internal volume defined by progressively proportioned spheres and with the external surface segments of the proportioned spheres mapped with wave form surfaces.
Figure 18:
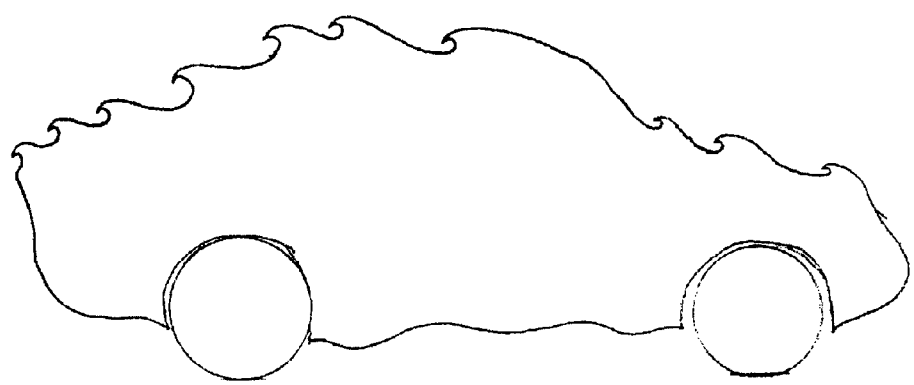
FIG. 18 is a side profile view showing only the outline of an automobile with its internal volume defined by progressively proportioned spheres and with the external surface segments of the proportioned spheres mapped with wave form surfaces.

Once the spherically proportioned surface has been defined for the vehicle, it is possible, as shown in FIGS. 17 and 18 to topographically map a pattern of proportionally sized wave forms on to the pattern of spherical zones 202. As noted above, the spherical zones or tiles are bounded or defined by the troughs of the valleys between the zones. By combining this proportionally arranged spherically patterned surface with the wave form concept described above, it is possible to define a vehicle surface that is proposed to be optimized for reducing drag. Moreover, it is also possible to design vehicles capable of holding spherical tanks suitable for storing pressurized air which would provide a further benefit of providing an alternative energy source for the vehicle. Still further, it may be possible to create a vehicle having a relatively low coefficient of drag that also retains the general familiar shape of a typical automobile.

The centers of three spheres of equal size, when the surfaces of the spheres are in contact with each other, will define an equilateral triangle having 60 degree angles. When a fourth sphere is added to the pattern, the centers of the four spheres define the corners of a regular tetrahedron. If a volume is filled with spheres as described above, and, if the spheres in the volume define a matrix of tetrahedrons, much as in a crystalline structure, then the surface of such a volume is likely to have diamond shaped areas. Accordingly, when mapping a pattern of proportionally sized wave forms onto spherical zones 202 as shown in FIGS. 17 and 18, such zones could have a diamond shape such that the wave forms mapped upon them would be distorted toward a diamond shape having a leading corner with an angle of less than 90 degrees which differs from the square tile configuration shown in FIG. 2.

The skilled reader should appreciate that the above described surfaces may also be applied to other moving objects for which air resistance is a factor. For example, a car top mounted luggage container may be given a wave form surface such as shown in FIGS. 1-3 or FIG. 18. Moreover, other surfaces of vehicles may be retrofitted with elements having wave form surfaces in order to add storage for the vehicle without increasing or even decreasing air resistance.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. An aerodynamic surface, comprising:
   (a) an aerodynamic surface adapted to receive on oncoming flow of fluid that moves from an upstream position to a downstream position in accordance with a direction of flow, the surface oriented such that the angle of attack between the receiving portion of the aerodynamic surface and the direction of flow of the fluid is less than 90 degrees,
   (b) the surface being divided into a pattern of generally diamond shaped areas, each diamond shaped area including a leading corner that is upstream from its diamond shaped area, opposite side corners and a trailing corner that is downstream from its diamond shaped area,
   (c) each diamond shaped area having a contour that when viewed from a cross section taken in a plane normal to the aerodynamic surface that passes through the leading corner and the trailing corner presents a wave shaped cross section having a wave form that forms a generally rounded crest adjacent to the trailing corner which further includes an undercutting tubular portion that is under the generally rounded crest and that extends slightly forward of the downstream end of the generally rounded crest the undercutting tubular portion extendin laterally substantially from the trailing corner to each of the opposite side corners,
   whereby, fluid passing over the aerodynamic surface follows a path of least resistance such that resistance offered by the aerodynamic surface is reduced.

* * * * *